United States Patent [19]

Inhelder et al.

[11] 3,728,586

[45] Apr. 17, 1973

[54] AC POWER MODULE HAVING AN INTEGRAL MECHANICAL SAFETY DEVICE

[75] Inventors: Alan E. Inhelder, Mountain View; Richard L. Hoogner, Sunnyvale, both of Calif.

[73] Assignee: Hewlett-Packard Company, Palo Alto, Calif.

[22] Filed: Jan. 7, 1972

[21] Appl. No.: 216,310

Related U.S. Application Data

[63] Continuation of Ser. No. 046,406, June 15, 1970.

[52] U.S. Cl. ............... 317/114, 317/116, 337/4, 337/211, 339/37, 220/3.8
[51] Int. Cl. ............................................ H02b 1/18
[58] Field of Search ................... 317/9 T, 99, 114, 317/116, 118, 120; 200/50 B; 337/4, 148, 211, 186, 212; 174/52 R, 59, 66, 67; 339/36, 37; 220/3.8

[56] References Cited

UNITED STATES PATENTS 3,080,493   3/1963   Kleinman ........................ 174/67
1,620,814   3/1927   Getchell ........................ 317/120 X

FOREIGN PATENTS OR APPLICATIONS 28,607   11/1932   Netherlands ........................ 339/36

Primary Examiner—Robert K. Schaefer
Assistant Examiner—Gerald P. Tolin
Attorney—A. C. Smith

[57] ABSTRACT

An A.C. power receptacle is contained in one compartment of a module and a fuse holder, fuse ejector and line voltage switch are contained in the other compartment. A sliding door allows access to only one compartment at a time, and a safety interlock prevents the line voltage switch from being changed unless the fuse is ejected.

5 Claims, 6 Drawing Figures

3,728,586

INVENTORS
ALLEN E. INHELDER
RICHARD L. HOOGNER

AC POWER MODULE HAVING AN INTEGRAL MECHANICAL SAFETY DEVICE

This is a continuation of application Ser. No. 046,406, filed June 15, 1970.

BACKGROUND AND SUMMARY OF THE INVENTION

Most electrical instruments and appliances require electrical power from an external source, usually A.C. line power, and it is often convenient to make the line power cord or cable detachable from the instrument or appliance. The power cord is usually made detachable by providing an A.C. power receptacle on the instrument or appliance which the power cord plugs into. It is also usually necessary to have a fuse between the A.C. line power connector or cord and the remainder of the apparatus to prevent damage to the apparatus if it should draw an excessive amount of current. In addition, since either 115 volt or 230 volt line power may be available in a particular country or locality, a piece of equipment must be provided with a switch or some other means to enable it to use both types of power. In the prior art these various components: the A.C. power receptacle, fuse holder and line voltage switch along with such items as serial number tags were all mounted separately on the instrument or appliance. Mounting these components separately not only required a multitude of mounting holes, increasing production costs; but it provided a potential safety hazard. A person could accidentally change the line voltage switch with the instrument connected to A.C. line power and possibly cause damage to the instrument. A person could also remove the fuse without disconnecting the instrument from A.C. line power and risk getting a shock.

A preferred embodiment of the present invention discloses a device which combines the A.C. power receptacle, fuse holder and ejector, and line voltage switch in one module. A safety device prevents changing the fuse or line voltage setting while the A.C. line power cord is plugged into the instrument or appliance. The safety device is a sliding door which covers either the A.C. line power receptacle or the fuse holder, ejector and line voltage switch. Additionally, it is usually desirable to change the fuse when the line voltage is changed, since for the same power dissipation, a piece of equipment will use twice the current at 115 volts that it will use at 230 volts. Therefore the fuse ejector prevents the line voltage switch from moving except when the ejector is in the "ejected" position and the fuse is therefore out of the circuit. Serial number, line voltage, and fuse rating information may be included on the module, as well as a line filter to remove high frequency interference from the A.C. line voltage, thus providing in one compact unit what used to require up to half a dozen items.

DESCRIPTION OF THE PREFERRED EMBODIMENT

Figure 1:
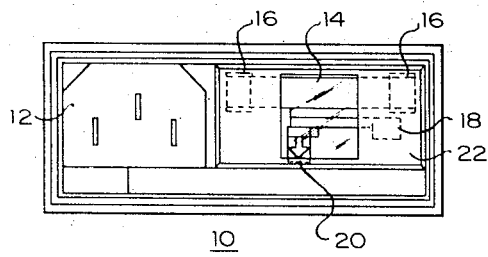
FIG. 1 shows a front view of a preferred embodiment with the door over the fuse and the line voltage switch.

FIG. 1 shows a power module 10 with an A.C. line power receptacle 12, fuse 14, fuse holder 16, fuse ejector 18, line voltage switch 20 and sliding door 22. The power module 10 is ready to accept a plug-in power cord (not shown) in receptacle 12; the fuse 14 and line voltage switch 20 are inaccessible because they are covered by door 22.

Figure 2:
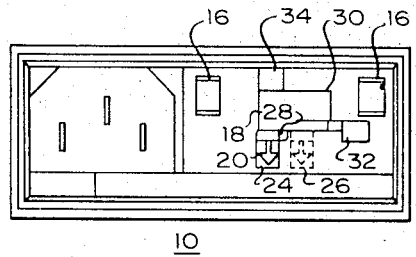
FIG. 2 shows a front view of a preferred embodiment with the fuse ejector in the "retracted" position.

FIG. 2 shows power module 10 with fuse 14 removed, door 22 removed for illustration purposes, and fuse ejector 18 in the "retracted" position. Line voltage switch 20 has two positions, position 24 for 230 volt operation and position 26 for 115 volt operation. A tab 28 on fuse ejector 18 prevents switch 20 from moving when ejector 18 is in the retracted position. Fuse ejector 18 rotates about a pivot 34 and also has a handle 32 and a cam surface 30. When handle 32 is pulled out from the plane of the drawing, cam surface 30 pushes on fuse 14 (not shown in FIG. 2) to eject it from fuse holder 16.

Figure 3:
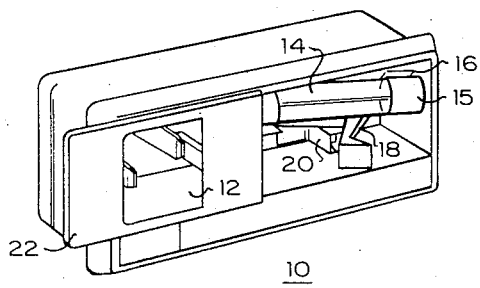
FIG. 3 shows a three-quarters view of a preferred embodiment with the fuse partially ejected and the door over the A.C. line power receptacle.

FIG. 3 shows power module 10 with a partially ejected fuse 14. Door 22 covers power receptacle 12, allowing access to fuse 14 and switch 20. As ejector 18 continues to rotate about pivot 34, cam surface 30 pushes end 15 of fuse 14 out of fuse holder 16. The fuse 14 may then be grasped with one's fingers and removed completely.

Figure 4:
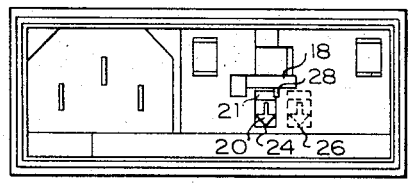
FIG. 4 shows a front view of a preferred embodiment with the fuse ejector in the "ejected" position.

FIG. 4 shows power module 10 with ejector 18 in the ejected position. When ejector 18 is in this position, tab 28 is above an offset 21 on switch 20 and switch 20 can then be moved from position 24 to position 26 or vice versa.

Figure 5:
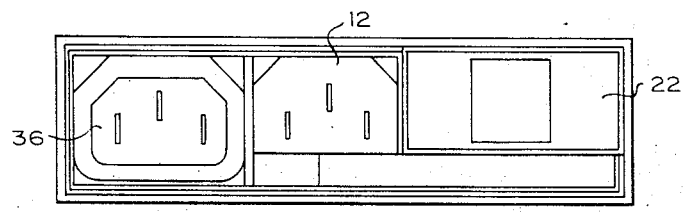
FIG. 5 shows a front view of another preferred embodiment with an auxiliary output socket.

FIG. 5 shows a power module 11 which contains the same elements as power module 10 in FIGS. 1–4 and also contains a power socket 36 so that auxiliary equipment (not shown) can be powered from the equipment power module 11 is mounted in. Power socket 36 is connected in parallel with power receptacle 12, although there may be a switch between the two in order that the power switch (not shown) for the equipment containing power module 11 may switch the power for the auxiliary equipment also.

Figure 6:
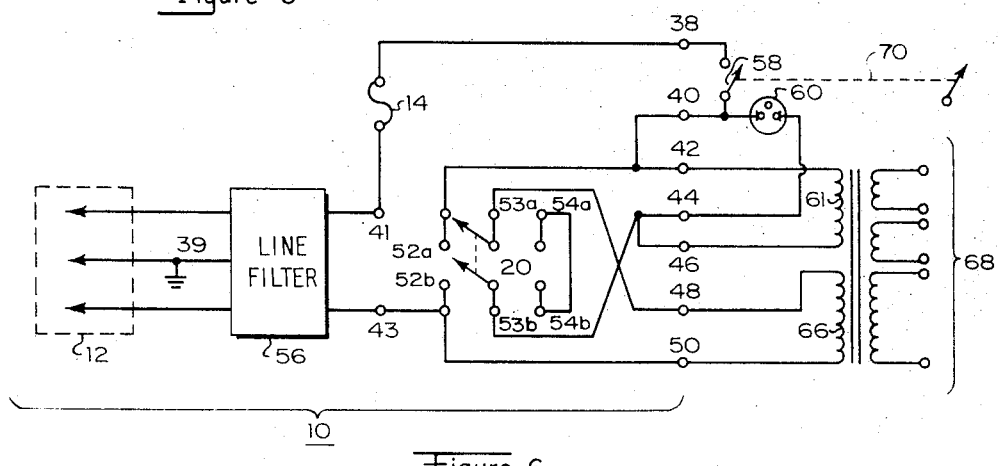
FIG. 6 shows a schematic diagram of a preferred embodiment.

FIG. 6 shows a schematic diagram of power module 10 and the interconnections with a power switch 58, a neon pilot light 60 and a power transformer 62, such as might be found in a piece of electronic equipment using a power module. In power module 10 line filter 56 is connected in series with line power receptacle 12 and the ground wire, shown as wire 39, is connected to chassis ground in the piece of equipment containing power module 10. Fuse 14 is connected in series with a terminal 41 of line filter 56 and an output terminal 38. Line voltage switch 20 has terminals 52 *a* and *b* connected to output terminals 42 and 50 respectively, terminals 53 *a* and *b* connected to output terminals 48 and 46 respectively and terminals 54 *a* and *b* connected together. Terminal 52*b* is also connected to terminal 43 of the line filter. Equipment power switch 58 is connected in series with terminals 38 and 40, terminal 40 being connected in terminal 42. Pilot light 60 is connected in series with terminals 40 and 44, terminal 44 being connected to terminal 46.

Transformer 62 has two identical primary windings, 64 and 66, and secondary windings 68. Winding 64 is connected between terminals 42 and 46; winding 66 is connected between terminals 48 and 50. When switch 20 connects terminals 52 and 53, windings 64 and 66 are in parallel for 115 volt operation; and when switch 20 connects terminals 53 and 54, windings 64 and 66 are in series for 230 volt operation. Although not shown, the power switch 58 may also be included in a separate compartment of power module 10 and be actuated by a mechanical linkage 70 from the front of the apparatus. The power module may of course be implemented without the line filter or with any number of othe rearrangements of the components, and any person skilled in the art will understand that such can be done without departing from the spirit and scope of this invention.

We claim:

1. An input power module comprising:
   a module housing and a sliding door, the module housing having first and second adjacent compartments, each compartment having an opening, the openings being coplanar, and the sliding door sliding in the housing to cover one of the first and second compartment openings;
   an input power connector mounted in the first compartment;
   a fuse ejector having a first and second position;
   a switch having a first and second position;
   a fuse, a fuse holder, the fuse ejector and the switch being mounted in the second compartment;
   the switch being locked in one of the first and second positions when the fuse ejector is in the first position; the fuse being ejected from the fuse holder and the switch being unlocked when the fuse ejector is in the second position; and
   a plurality of output terminals connected to the input power connector, fuse holder and switch.

2. Input power module as in claim 1 wherein the power module includes a filter connected to the input power connector.

3. Input power module as in claim 1 wherein the power module includes an output power socket connected in parallel with and adjacent to the input power connector.

4. In an electrical apparatus including electrical circuits:
   an electrical module comprising input means for receiving electrical power;
   fuse holding means mounted in the housing for holding the fuse;
   circuit means including a fuse and switch means connecting the input means to the electrical circuits;
   a housing containing the input means and the fuse and switch means;
   a mechanical means connected to the housing for preventing access to and reception of electrical power by the input means in response to the fuse and switch means being accessible and for preventing access to the fuse and switch means in response to the input means being accessible; and
   fuse ejecting means for ejecting the fuse, the fuse ejecting means preventing operation of the switch means when the fuse is held in the fuse holding means and the ejecting means being inoperable when the mechanical means prevents access to the fuse.

5. Electrical module as in claim 4 wherein there is an additional switch connected between the input means and the electrical circuits and the additional switch is mounted in the housing.

* * * * *